Oct. 4, 1955  C. L. HUBER  2,719,588
WELL TESTING METHOD AND APPARATUS
Filed April 3, 1950  4 Sheets-Sheet 1

INVENTOR.
CLYDE L. HUBER
BY
Mellin and Hanscom
ATTORNEYS

Oct. 4, 1955

C. L. HUBER 2,719,588

WELL TESTING METHOD AND APPARATUS

Filed April 3, 1950

INVENTOR.
CLYDE L. HUBER

BY

ATTORNEYS

Oct. 4, 1955

C. L. HUBER 2,719,588

WELL TESTING METHOD AND APPARATUS

Filed April 3, 1950

INVENTOR.
CLYDE L. HUBER

BY
Mellin and Hanscom
ATTORNEYS

Oct. 4, 1955

C. L. HUBER 2,719,588

WELL TESTING METHOD AND APPARATUS

Filed April 3, 1950

INVENTOR.
CLYDE L. HUBER
BY
Mellin and Hanson
ATTORNEYS

United States Patent Office 2,719,588
Patented Oct. 4, 1955

2,719,588
WELL TESTING METHOD AND APPARATUS

Clyde L. Huber, Houston, Tex., assignor, by mesne assignments, to Johnston Testers, Inc., Houston, Tex., a corporation of Delaware Application April 3, 1950, Serial No. 153,513

12 Claims. (Cl. 166—152)

This invention relates to well testing apparatus and methods for deep well bores, and is particularly concerned with determining the composition and characteristics of the native fluid at a selected point in a well bore.

The present invention contemplates a testing method and an apparatus therefor involving the securement of a removable container of uncontaminated formation fluid at its natural pressure, which container is filled with fluid and sealed at the pressure existing at the selected portion of the casing, the arrangement being such that the container may be removed from the test string and set aside for tests and inspection at leisure or dispatched unopened and without disturbing the pressure conditions thereof to a distant laboratory where testing devices and testing skill may be applied, which skill and equipment may not be available in the field.

It is therefore among the general objects of the present invention to provide a novel and improved method and apparatus for testing well fluids and pressures.

Another general object of the present invention is to provide a novel and improved method and apparatus for sampling well fluids and determining well pressures, the control and operation of which are by means of manipulation of a test string to the end that packers, valves, recorders, sampling means and the like may all be actuated and controlled from the surface above the well.

More particularly, it is an object of the present invention to provide in combination with equipment such as valves, packers, pressure recording devices and the like, a receptacle which may be filled with the fluid to be sampled and which may be sealed under the formation pressure of the fluid being sampled.

A further object of the present invention is to provide a receptacle of the character set forth above, which may be readily removed from the test string and retained indefinitely and transported to a testing laboratory without disturbing the contents or the pressure of the material sealed therein.

Another object of the present invention is to provide a receptacle of the type herein set forth, including automatically actuated valve means by which the receptacle is opened for filling only at such time as pure formation fluid from the selected point in the well casing is present, free from dilution or adulteration by extraneous fluids.

A further object of the present invention is to provide the receptacle of the character set forth including valve means by which the pressure under which the receptacle is sealed may be determined after the receptacle has been withdrawn from the casing and transported to a testing laboratory.

Other objects of the present invention relate to the combination and inter-relation of parts and instrumentalities by which the organization provides a rugged, durable, effective and efficient test apparatus for performing several distinct and different testing operations in combination with the loading and sealing of a sample receptacle under pressure of the fluid at the point tested.

Numerous other objects and features of the present invention will be apparent from a consideration of the following specification taken in conjunction with the accompanying drawings, in which:

Fig. 1 is a side elevation of an entire test string embodying the present inventive concept.

Fig. 2 is a detailed vertical section of the trip valve of the present invention showing the valve closed, the section of the test string illustrated being indicated at I in Fig. 1.

Fig. 3 is a similar view of the trip valve showing the trip valve open.

In general terms, the test string here illustrated in detail as embodying a preferred form of the present invention may be defined as including the trip valve I, a valved test receptacle and control assembly II, a retainer valve and equalizer assembly III, a packer IV, and a recorder and anchor pipe V. While the test string thus constituted exemplifies one practical application of the present inventive concept, it will be understood that the invention is not limited to this specific structure and arrangement of parts. Obviously other forms of trip valves, equalizers and retaining valves as well as packers and the like may be used in the string as full equivalents of the structure here shown by way of illustration. It will also be understood that the specific relation of the components here present need not be adhered to nor is the invention restricted to the use of all the components here shown. Other formation testing apparatus may be substituted or added as circumstances dictate without departure from the present invention. It may also be noted that while the components are shown as closely coupled by short nipples or subs, such coupling is by no means a requisite and the components may be spaced by many feet of intervening tubing string if desired. For instance, as indicated by the break in Fig. 1, the trip valve I may be a long distance from the test receptacle II. Other components may be similarly spaced as desired.

Throughout the drawings, the left-hand even numbered detail Figs. 2, 4, 6 and 8 show the components with valves closed and packer retracted, in which position the parts are arranged before lowering the tester into the well. The right-hand Figs. 3, 5, 7 and 9 show the parts in testing position with the packer set and the valves open.

Trip valve I

Referring more particularly to the drawings, the trip valve I is shown in open and closed positions in Figs. 2 and 3, respectively. The trip valve includes an internal valve actuator stem 10, the stem being vertically ported as indicated at 11 to permit upward flow of fluid when the valve is open. Externally the stem 10 is provided with an annular groove 12 which, when in lowered position, receives therein control balls 13 which are mounted within apertures 14 of a relatively slidable sleeve portion 15 of the valve 16. The valve 16 is also vertically ported as at 18 for communication with the port 11 and in addition thereto has communicating radial ports 19, through which fluid is admitted to its central port 18. The valve 16 carries therewith a ball valve member 20 which, when the valve is closed as in Fig. 2, engages the valve seat 21 of a centrally ported nipple 22 carried by a bottom sub 30. A spring 23 encircles the valve 16 and bears against the nipple 22 to urge the valve ball 20 upwardly from its seat 21. As noted in Fig. 2, when the stem 10 is in raised position with respect to the valve 16, the control balls 13 are thrust outwardly and engage the lower face of a stop nipple 24 threadedly secured internally of the intermediate valve sub 25 which is supported from the upper valve sub 26.

By comparing Figs. 2 and 3, it will be seen that when the actuator stem 10 is forced downwardly with respect to the valve 16 as by an impact from a go-devil or like instrument (not shown), the annular groove 12 registers with the control balls 13 which are thus permitted to move upwardly from below the stop nipple 24 and thus release the valve 16 and permit the spring 23 to raise the valve to lift the ball valve 20 from its seat 21 upon the nipple 22 to permit upward flow of fluid through the trip valve, the parts then being in the position shown in Fig. 3.

As previously indicated, the trip valve is in the closed position of Fig. 2 when the test string is lowered into the well casing 28 by its tubing string 29. When a test is to be made, the valve is sprung open by an impact on the head 27 of the stem 10. The trip valve is then opened in the manner stated and the parts are in the position indicated in Fig. 3. Once having been opened, the trip valve retains its open position until the test is completed and the test string is removed from the well casing.

*Test receptacle and control assembly*

Figure 4:
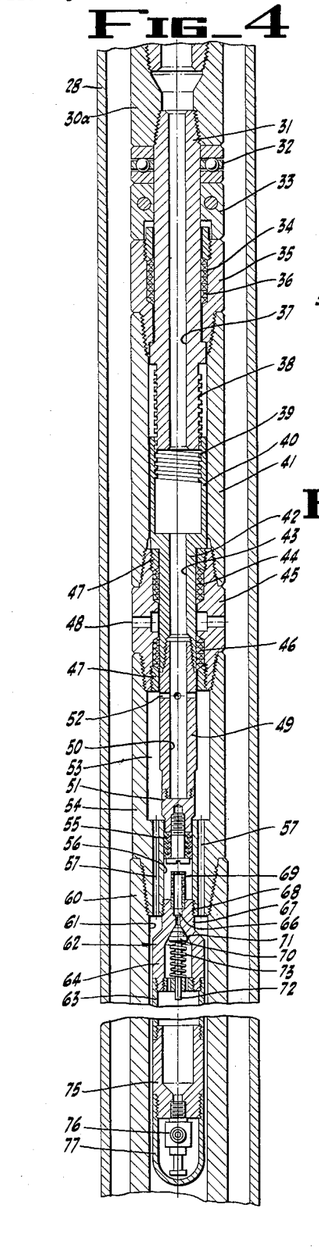
Fig. 4 is a detailed vertical section showing the test receptacle and its assembly indicated at II in Fig. 1, showing the control valve closed.

Arranged below the trip valve I and attached to the lower sub 30 of the trip valve through an intermediate sub 30a there is secured a jack mandrel 31, a thrust bearing 32 being mounted below the sub 30a encircling the jack mandrel 31 and spacing the sub 30 from a split ring 33. The split ring 33 abuts the top of a packing box 35, within which a packing gland 34 receives packing material 36 which seals the external wall of the jack mandrel 31. The mandrel 31 is provided with a central bore 37 and at its lower end it is provided with external threads 38 which engage the internal threads 39 of a cross head 40 which is slidably mounted within a main housing section 41. The cross head 40 has a reduced lower mandrel portion 42 provided with a central bore 43 and is surrounded by an upper packing 44 mounted in the upper portion of a sub 45 which threadedly engages the housing section 41. The sub 45 also has a lower packing 46, the packing 46 being retained in the sub by a gland 47. Intermediate the packings 44 and 46 the sub 45 is ported transversely by ports 48 communicating with the space between the tool and the well casing 28. Packings 44 and 46 by virtue of their frictional engagement with lower mandrel portion 42 function to retard rotary movement thereof so that when jack mandrel 31 is rotated it will thread into or out of cross head 40 to pull mandrel 42 upwardly or force it downwardly depending on the direction of rotation of said jack mandrel.

The lower end of the mandrel 42 is secured to a valve mandrel 49 which is slidable with the mandrel 42 through the sub 45 and its packings 44 and 46. The valve mandrel 49 has a blind central bore 50 closed by a valve forming end cap 51 while transverse ports 52 extend from the bore 50 to a space 53 within the valve housing sub 54. The end cap 51 is provided with a cylindrical valve member 55 which seats within a reduced valve passage 56 within the lower portion of the valve housing sub 54 which with the valve 55 constitutes a valve for controlling the passage of fluid to the receptacle hereinafter described.

Surrounding the passage 56 there is a plurality of vertical fluid ports 57 which permits the passage of fluid upwardly without permitting access of the fluid to the passage 56 when the mandrel is in lowered position as indicated in Fig. 4. Fluid under pressure may thus pass around the receptacle through ports 57, transverse ports 52 and upwardly in the string prior to filling of the receptacle. As will be hereinafter pointed out, the ports 52 will register with the ports 48 when the valve 55 is raised, thus blocking passage of test fluid upwardly and equalizing inner and outer fluid pressure above the test receptacle.

Threadedly secured at the lower end of the valve housing sub 54 there is provided a tubular test section 60, the enlarged bore 61 of which communicates with the passages 57 and mounted therein is a test receptacle generally indicated by the numeral 62. The diameter of the receptacle 62 is less than the internal diameter of the bore 61 of the section 60 so as to permit upward passage of fluid around the test receptacle. The receptacle 62 includes a central cylindrical body section 63 and a valved inlet end cap 64, the central port 66 of which is provided with a screening nipple 69 which is mounted within the central constricted vertical bore 56 of the valve sub 54. The terminal neck 67 of the end cap 64 of the receptacle threadedly engages the internal threads 68 of the lower end of sub 54. Within the bore 66 of the neck portion of the end cap 64 of the receptacle there is mounted a frusto-conical valve 70 seating against a similarly formed valved seat 71 formed in the bore 66. The valve 70 is carried upon a longitudinally extending valve stem 72 which is encircled by a valve spring 73 which normally urges the valve 70 against its seat 71. The opposite end of the receptacle 62 is provided with a closure 75, at the end of which there is threadedly secured a needle valve 76 enclosed within a removably threaded end cap 77.

The foregoing construction and arrangement of parts permit the upward passage of fluid around the receptacle 62 through the ports 57 and into the space 53. With the valve 55 in the position shown in Fig. 4, the passage of fluid into the valve passage 56 and thence to the receptacle is precluded. However, in this position, fluid may pass upwardly in the string by passage through ports 52 and through the bore 43 of the mandrel 42.

Figures 5, 5A:
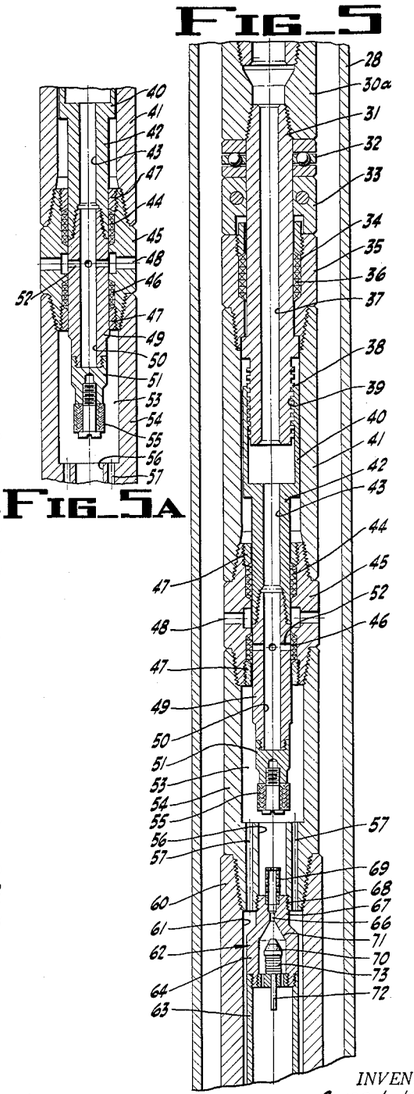
Fig. 5 is a view similar to Fig. 4 showing the control valve open and the receptacle being filled.
Fig. 5a is a view showing the test receptacle control valve in back scuttling position.

As indicated in Fig. 5, when it is desired to entrap fluid from below the packer within the receptacle, the jack mandrel 31 is rotated, thereby lifting the cross head 40 and mandrels 42 and 49 to lift the valve 55 to an intermediate position out of the passage 56 and permitting fluid to flow from the passages 57 downwardly to the screened nipple 69 and thence to the valve 70. In such position, ports 52 are moved from the chamber 53 so that the entire formation pressure is applicable to the receptacle. Full longitudinal movement is, however, not imparted to the cross head and the ports 52 are not moved to registration with the ports 48 as shown in Fig. 5a when a sample is taken by the receptacle. When the pressure of the fluid admitted through the passage 56 is sufficient to overcome the force of the springs 73, the valve 70 will be forced from its seat and the fluid will be admitted to the receptacle 62. It will be readily observed that after the receptacle is filled with test fluid, such material will be retained therein at the pressure of the test zone and upon removal of the string the receptacle may be unscrewed from the sub 54 and transported to a test laboratory where the cap 77 may be removed and the pressure tested through the needle valve 76 prior to removal and testing of the fluid entrapped.

From Fig. 5a, it will be noted that valve 55, 56 may be fully raised so that the radial ports 52 will be in registration with the ports 48 to establish communication of the bores 50 and 43 with the well casing fluid above the packer. In such position of the ports, downward pressure may be applied in the string in order to back scuttle the casing.

For purposes hereinafter to be referred to, it should be noted that when the valve 55, 56 is closed as in Fig. 4 the cross head 40 is in abutment with the gland 47, so that further rotary movement of the cross head relative to the housing is prevented and thus any further rotation of the jack mandrel in valve closing direction will impart like rotation through the cross head to the test string therebelow. Likewise when the valve is open, as in Fig. 5, the cross head and jack mandrel are in abutment (their fully threaded up position) and further rotation in opening direction will be imparted to the string below the valve because further rotation of the cross head relative to the housing is impossible (the jack mandrel being effectively clamped against the housing by cross head 40).

*Tester valve and equalizer*

Figures 6, 7:
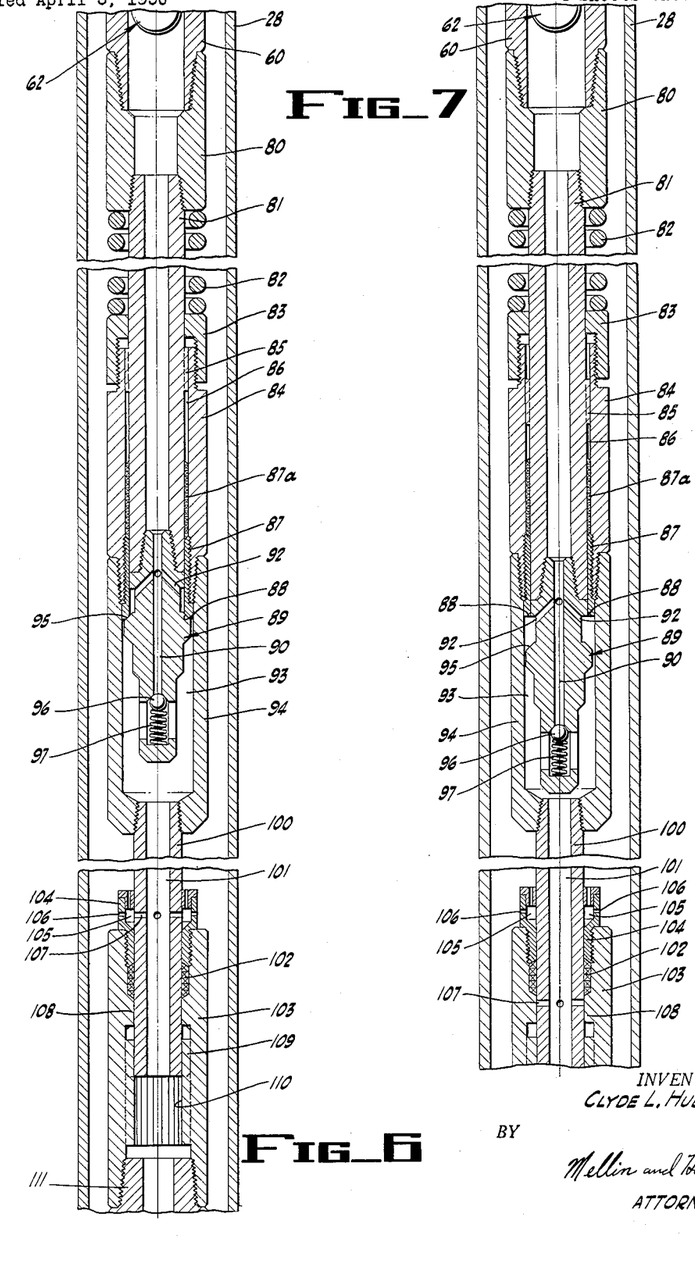
Fig. 6 is a detailed vertical section of the equalizing and retaining valves indicated at III in Fig. 1 showing the valve closed.
Fig. 7 is a view similar to Fig. 6 showing the equalizer valve open.

Below the test receptacle section II there is provided a tester or retainer valve section III, which includes a top sub 80 threadedly engaging sub 60 of section II from which extends a tubular valve mandrel 81, the upper end of which is encircled by a coil spring 82, the upper end of spring 82 bearing against the sub 80 while the lower end abuts a cap 83 mounted upon a packing box 84 in which the lower end of the mandrel 81 is fitted. The outer surface of the mandrel 81 is provided with splines 85 which engage complementary splines 86 at the top of the packing box 84 so as to permit the sliding motion of the mandrel 81 within the packing box but to preclude relative rotation between the mandrel and the packing box. Packing material 87a is retained within the lower end of the packing box 84 by means of a packing gland 87. The lower beveled end of the gland 87 forms a valve seat 88 for the retaining or tester valve 89 which threadedly engages the mandrel 81. Valve 89 has a central bore 90 having communication by means of side ports 92 with a space 93 surrounding the valve 89 within a retainer valve sub 94 secured to the lower end of the packing box 84. Intermediate the ends of the valve member 89 there is provided an annular valve shoulder 95 which, as shown in Fig. 6, is adapted when closed to engage and seal against the seat 88 of the gland 87. A ball check valve 96 normally urged against its seat by a spring 97 which is provided at the lower end of the valve 89 so as to permit equalization of pressure when the valve is closed.

In the operation of the tester valve 89 when in closed position as in Fig. 6, tension of the spring 82 urges the mandrel 81 upwardly in the packing box 84, thus seating the valve shoulder 95 against the valve seat 88. When the tester valve 89 is to be opened, the packer IV is first set as hereinafter explained, thus securing the retaining valve sub 94 against further downward movement in the casing 23. After thus securing the sub 94, further lowering of the test string will move the mandrel 81 downwardly in the packing box 84 to unseat the valve as shown in Fig. 7. Such movement is of course against the tension of spring 82 which obviously is overcome by the weight of the test string thereabove.

It should be noted that the interlocking splines 85, 86 provide for transmission of rotation through the retainer valve regardless of whether the valve is open or closed for purposes hereinafter set forth.

Threadedly engaging the lower end of sub 94 there is provided a mandrel 100 with a central bore 101 which extends through packing material 102 mounted within a sub 103. The packing 102 is secured in position by a packing nut 104 which has an annular passage 105 communicating through ports 106 to the exterior of the test string. The mandrel 100 is provided midway of its length with radial bores 107 which, when the valve 89 is closed as indicated in Fig. 6, are in registry with the annular passage 105 and fluid is admitted to the mandrel from the well casing above the well packer. Such fluid may not pass upwardly in the string, however, since the valve 89 is closed, but it may pass downwardly and become effective to prevent damage by excessive pressure in the manner of the equalizer 48, 52. When the valve 89 is open, as shown in Fig. 7, the ports 107 are below the packing 102 and are closed by a mandrel bearing surface 108 of the sub 103. The lower end of mandrel 100 is provided with splines 109 which engage the internal splines 110 of sub 103 so as to permit relative longitudinal motion between the parts but to transmit rotation from mandrel 100 to sub 103. The lower end of sub 103 is connected by one or more subs 111 to the packer section IV hereinafter described.

With respect to the equalizer thus described, it is to be noted that the present formation tester is disclosed as having an anchor pipe open to casing fluid which may enter and pass up the test string at all times. Under such circumstances, the pressure of such fluid is freely admitted up the string as far as the retainer valve 89 and thus under such circumstances an equalizer below the valve would not be required. However, test strings are frequently provided with closed lower ends which are to be opened only after the packer is set or the full effective pressure may not be secured until the well casing is pierced as by a gun and in some cases spaced packers are used to isolate a given casing section where a test is desired. In each of these instances an equalizer of the type set forth is required where pressures may be such as to collapse the test string if not equalized.

*Packer*

Figure 8:
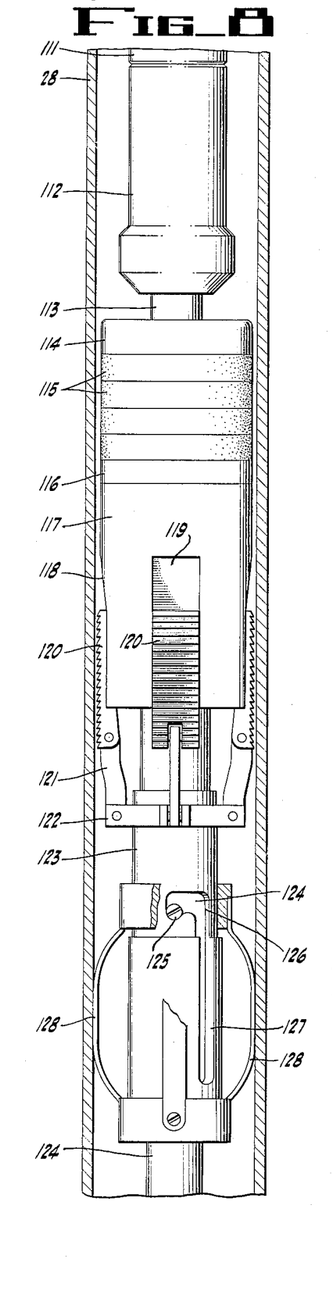
Fig. 8 is a detailed vertical section of the packer indicated at IV in Fig. 1 and showing the packer prior to setting.

Below the retainer valve and equalizer, the test equipment is provided with a well packer IV. The lower end of sub 111 or an equivalent extension from section III is connected with the upper end of a packer valve head 112. Extending downwardly from the head 112 there is provided a tubular packer mandrel 113, which extends entirely through the packer. The packer valve head 112, when the packer is in inoperative position as shown in Fig. 8 is upwardly spaced from the packer valve seat 114 formed at the top of a packer ring sleeve upon which the expansible packer rings 115 are mounted. The packer ring sleeve is spaced from the mandrel 113 so that with the valve 112, 114 open as in Fig. 8, casing fluid may pass freely through the packer and offers no resistance to the downward movement of the packer as the test string is being lowered.

Below the packer rings 115 there is slidably mounted on the ring sleeve a compressor ring 116 carried by an expanding cone 117 upon the frusto-conical surface 118 of which is provided tapering ways 119 in which are seated slips 120. The slips 120 are pivotally secured to the upper ends of slip reins 121 extending upwardly from a slip collar 122 mounted upon a tubular sleeve 123. The sleeve 123 is slidably mounted upon the lower extension 124 of the mandrel 113 but may be locked against sliding movement on the mandrel by a setting pin 125 carried by the mandrel which engages a bayonet slot in the sleeve comprising an annular portion 126 and a longitudinal portion 127. It will of course be seen that with the pin 125 in the annular portion 126, the mandrel and sleeve are locked together against relative sliding motion. When so locked as when the string is being lowered into position as in Fig. 8, there can be no relative longitudinal movement between the valve head 112 with its mandrel 113 and either the sleeve 123 or the expanding cone 117 which is supported on the ring sleeve by the slips 120. Mounted upon the sleeve 123 there are provided anchor springs 128 which bow outwardly from the sleeve and provide frictional contact with the casing 24 at all times.

Figure 9:
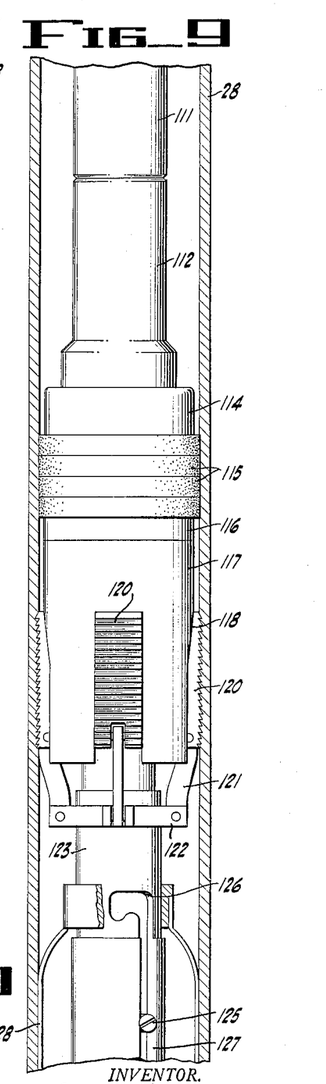
Fig. 9 is a view similar to Fig. 8 showing the packer in set position.

In the operation of the packer when it has been lowered to the desired location, the head 112 and mandrel 113 are given a turn in a direction to move the pin 125 to the right in Figs. 8 and 9. Since the sleeve 123 is frictionally restrained against either rotation or longitudinal movement by the anchor springs 128, such movement will move the pin from the annular portion 126 of the bayonet joint to the longitudinal portion 127, thus releasing the sleeve for relative sliding motion on the mandrel extension 124. Thereafter further downward movement of the string will permit the mandrel 113 and its extension 124 to slide through the packer assembly until the valve 112 is seated on its seat 114 whereupon further downward movement carried through the ring sleeve and packing rings will move the expanding cone toward the sleeve. Upon such movement, the slips 120 will be forced outwardly to engage the casing 23 and positively lock the sleeve to the casing. Continued downward movement of the string will cause the head 112 to compress the rings 115 longitudinally whereupon they will expand radially to engage and seal against the casing. Since the packer valve is closed as an incident to this setting of the packer, fluid beneath the packer will be isolated from casing fluid thereabove. In such condition, the parts are as shown in Fig. 9.

When the testing operation is concluded, upward pull on the test string will relieve the pressure on the rings and open the packer valve as the mandrel extension 124 moves upwardly in the sleeve 123, the sleeve being momentarily restrained against movement by the springs 128. During such movement, the pin 125 will move upwardly in the bayonet slot to the portion 124 and the parts may again be locked in inoperative position by relative rotation if so desired. Such locking during withdrawal of the string is however usually unnecessary.

Recorder and anchor pipe

Figure 10:
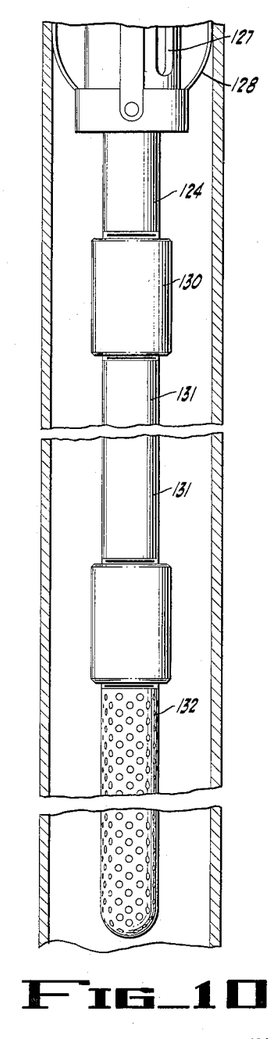
Fig. 10 is a vertical elevation showing the recorder and anchor pipe.

Below the well packer there is provided a pressure recorder 130 threaded onto the mandrel extension 124 or a further extension thereof. The specific type of recorder forms no part of the present application, various well pressure recorders now on the market being adaptable for the use here indicated. Suffice it therefore to indicate that the recorder preferably includes an electrically or mechanically driven chart upon which a stylus or scriber actuated by the diaphragm, which is subjected to casing fluid pressures, records the various pressures as the string is lowered and withdrawn and while the test is being conducted.

The pressure recorder 130 records or charts all pressure changes and conditions while going in and coming out of the casing, as well as during the entire time that the formation tester is located at the desired point within the well. The recorder charts the hydrostatic pressure of the fluid column, the flow pressures and the static formation shut-in pressure. Suitably spaced by subs 131 below the recorder 130 there is provided inlet means such as the perforated anchor pipe 132. Obviously other types of inlet means may be provided below the recorder as desired.

Operation

In the operation of the present apparatus, the components are assembled to form a test string as shown in Fig. 1. As assembled, the parts of each component are in the position shown in Figs. 2, 4, 6 and 8. The trip valve I is closed, control valve 55, 56 of the test receptacle section II is closed and the ports 52 are in lowered position to establish free communication between chamber 53 and bores 43 and 37 of mandrels 42 and 31, respectively. In section III the tester valve is closed while equalizer ports 107 register with the groove 105 to permit admission of well fluid. The packer is collapsed and with its valve open and the recorder is put in operation. With the parts so arranged, the string is lowered into the well casing to a position where the anchor pipe 132 is at the location where testing is to be made.

When the test is to be made, the tubing string is rotated in a direction to move the setting pin 125 of the packer out of its locked position in the annular portion 124 of the bayonet slot in the cage sleeve 123 and into the longitudinal portion 127 thereof.

With respect to the initial relation of the string to release the packer for setting, it should be noted that such rotation need be but slight in order to move the pin 125 only the length of the annular slot 124. It should also be noted that the direction of rotation is the opposite of that required for opening the test receptacle valve 55, 56. That is, such rotation is in the direction of closing the valve 55, 56. However, since this valve is originally fully closed with the cross head 40 abutting the gland 47, further closing movement and relative closing rotation between jack mandrel 31 and cross head 40 are precluded and thus rotation in this direction will be transmitted through sections II and III to the packer section IV.

After thus releasing the packer setting pin 125, the test string is then further lowered so that the mandrel 112 of the packer IV moves downwardly relative to the cage sleeve 122, the latter being held stationary by frictional engagement of the radially bowed springs 128 with the well casing. Such downward motion of the mandrel 112 first closes the by-pass valve 112, 114 and thereafter further such motion results in outward expansion of the slips 81 against the casing, after which continued downward motion opens the tester or retaining valve III and moving relief ports 107 thereof from communication with the casing. A continuation of the downward movement of the tubing string then completes the expansion of the packing rings 115 into fluid-tight engagement with the well casing, so that the packer IV prevents the hydrostatic head of fluid in the annulus around the tubing string and above the packer from being imposed on the casing fluid below the packer. Accordingly, production fluid entering the well casing through the anchor pipe 132 is prevented from being contaminated by the fluid in the casing above the packer IV.

As has just been indicated, the formation tester retaining or tester valve (assembly III) has been opened, which action takes place as a result of relative longitudinal motion between the retainer valve mandrel 86 and top sub 84, to cause the testing valve 89 to disengage the valve seat 88 and expose the ducts 92. A fluid passage is thus provided through the retainer valve III so that the formation fluid below the packer IV may flow from the formation, through the packer and applied to the pressure recorder 130 and thence upward past the retainer valve and through the valve mandrel 86 into section II. In section II the fluid passes around the receptacle 63, thence through the ducts 57 into and through sub 54 and relief ports 52 to mandrel 31 and up to the trip valve assembly I.

Since there is fluid in the casing below the packer IV and in the formation tester below the retainer valve III, the fluid will not enter the formation tester and flow through the retainer valve until the trip valve assembly I has opened. The fluid below the packer IV and within the formation tester may be admitted to the tubing string by dropping a go-devil (not shown) through the tubing string and allowing it to strike the head 27 of the stem 10 of the trip valve assembly so as to drive the plunger downwardly from the position shown in Fig. 2 to that shown in Fig. 3. In this position of the stem 10, the annular recess 12 therein is moved downwardly into registry with the ball carrying holes of valve sleeve 15 to permit the retaining balls 13 to move inwardly into the annular recess 12 out of engagement with the lower end of the stop nipple 24. The downward motion of the stem 10 thus serves to release the trip valve 16 for upward motion under the force of the spring 23 to allow the ball 20 to move upwardly out of sealing engagement with its valve seat 21. The casing fluid and production fluid being sampled may then flow past the ball valve 20, through the bore 11, and thence upwardly through the top coupling or sub 29 into the tubing string.

If the formation surrounding the perforated portion of the well casing below the packer IV is under sufficient pressure, the sampling test may be conducted under flowing conditions. If, however, the pressure in the penetrated formation is insufficient to maintain flowing conditions, the test sample may be obtained by allowing the produced sample fluid to rise in the tubing string to a level at which its static head is in equilibrium with the pressure head of the formation, and this sample may be recovered in the tubing string by withdrawing the test string from the well casing. The retaining valve III closes upon upward movement of the tubing string as a result of the action of the spring 55 in elevating the apparatus in the well casing so that the fluid sample in the tubing string is trapped by this valve.

Prior to withdrawing the string to secure a sample for field test, it is desirable to secure a sealed receptacle of the fluid, sealed under formation pressure, which receptacle may be tested for pressure as well as trapping a test sample which may be retained indefinitely or transported to a test laboratory. In the present apparatus this is accomplished by the apparatus of section II. After sufficient flow has been established to ensure the presence of unadulterated formation fluid in section II, the string is rotated (reversely of the rotation imparted for releasing the packer pin 125) whereby the jack mandrel 31 rotates in the cross head raising the valve 55 from the passage 56 to admit formation fluid thereto after moving ports 52 from communication with chamber 53 so that the chamber is sealed from above and full formation pressure obtains in chamber 53. Under such conditions the pressure of the formation fluid forces the receptacle valve 70 from its seat and enters the receptacle 63 compressing the air thereof to the extent of the formation pressure. Thereafter when the string is raised and pressure is reduced the valve 70 will close, thus sealing in the receptacle a formation sample at formation pressure. After the string is removed and disassembled, the receptacle 63 is unscrewed from the sub 54 and may be inspected and tested when and where desired. When the formation fluid is gas which might be compressed as the string is withdrawn permitting pressure of the hydrostatic head in the casing to force casing fluid into the receptacle after the sample has been taken the valve 55, 56 is closed by reverse rotation of the string before the string is withdrawn.

In determining the formation pressure as sealed in the receptacle, a gauge may be applied to the needle valve 76 and the valve then opened; thus an accurate laboratory determination of the formation pressure may be secured. Thereafter the receptacle may be opened and the fluid itself inspected.

From the foregoing, it will be seen that the present apparatus and method provide for recording casing pressures throughout the length of the well casing, sealing off a selected formation section, recording the pressure at the sealed formation, securing a sample of the formation fluid either by flowing through the test string or entrapping it within the string and further securing a sealed, removable and transportable receptacle of the formation fluid sealed under formation fluid pressure.

Obviously the invention is not limited to the specific apparatus or method steps herein set forth but numerous changes, modifications and the full use of equivalents may be resorted to in the practice of the invention without departure from the spirit or scope of the appended claims.

Having thus described my invention, what I claim and desire to secure by Letters Patent is:

1. A tester device of the class described, comprising a tubular housing open at its lower end adapted to be seated in a well bore, a mandrel adapted to be fixedly connected at its upper end to a tester string of pipe and rotatably extending into the upper end of the housing, a sample receptacle detachably secured within and to the tubular housing and having a pressure-responsive valve openable under pressure to communicate the interior of the receptacle with the exterior thereof, and means including a mechanically operated valve sealingly enclosing the pressure-responsive valve to prevent access of fluid thereto, said mechanically operated valve being threadedly connected to the mandrel whereby rotation of the mandrel will move said mechanically operated valve longitudinally to expose the pressure-responsive valve to the well fluid in said housing to enable the entrapment of a sample.

2. A tester device of the class described, comprising a tubular housing open at its lower end adapted to be seated in a well bore, a mandrel adapted to be fixedly connected at its upper end to a tester string of pipe and rotatably extending into the upper end of the housing, a tubular sub interposed in said tubular housing and having a central bore therethrough, passageways formed in the walls of said sub by-passing said central bore providing communication between the interior of the upper and lower portions of said housing, a sample receptacle detachably secured to the sub and closing the lower end of the central bore thereof and having a pressure-responsive valve exposed to the interior of the central bore, a mechanically actuated valve closing the upper end of the bore to sealingly enclose pressure-responsive valve, and means connecting the mandrel and the mechanically actuated valve, operative in response to rotation of the mandrel to unseat the mechanically actuated valve to expose the pressure-responsive valve to the well fluid in said housing to enable the entrapment of a sample.

3. A tester device of the class described, comprising a tubular housing open at its lower end adapted to be lowered into a well bore by a tester string of pipe and adapted to be seated in a well bore, a tubular sub interposed in said housing and having a central bore therethrough, passageways formed in the walls of said sub by-passing the central bore providing communication between the interior of the upper and lower portions of said housing, a sample receptacle detachably secured to the sub and closing the lower end of the central bore thereof and having a pressure-responsive valve exposed to the interior of the central bore, a mechanically actuated valve closing the upper end of the bore to sealingly enclose the pressure-responsive valve, and means connected to said mechanically actuated valve and to the tester string and operative in response to a predetermined movement of said tester string for unseating the mechanically actuated valve to expose the pressure-responsive valve to the well fluid in said housing to enable the entrapment of a sample.

4. A tester device of the class described, comprising a tubular housing open at its lower end adapted to be seated in a well bore by a tester string of pipe, a sample receptacle detachably secured within and to the tubular housing and having a pressure-responsive valve openable under pressure to communicate the interior of the receptacle with the exterior thereof, means providing a passageway communicating at one end with the pressure-responsive valve and at the other end with the interior of the housing, a mechanically actuated valve closing said passageway to seal off access of fluid to the pressure-responsive valve, and means connected to said mechanically actuated valve and to the lower end of the tester string and being operative in response to a predetermined movement of the string for unseating the mechanically actuated valve to expose the pressure-responsive valve to the well fluid in said housing to enable the entrapment of a sample.

5. A formation tester, comprising an upper mandrel formed at its upper end for securement to the lower end of a tester string, a tester housing open at its lower end rotatably suspended from the mandrel and into which the mandrel extends, a packer mounted on the lower end portion of the housing adapted to be seated in a well bore, a lower tubular sub interposed in said housing and having a through central bore, by-pass passages formed in the walls of said sub providing communication between the interior of the upper and lower portions of said housing, a sample receptacle detachably secured to the sub and closing the lower end of the central bore thereof and having a pressure-responsive valve exposed to the interior of the central bore, an upper tubular sub interposed in said housing, a lower tubular mandrel slidably received by the upper tubular sub and carrying a valve closing the upper end of the central bore of the lower sub to sealingly enclose the pressure-responsive valve, said lower tubular mandrel having lateral ports formed therein disposed below the upper tubular sub when the valve carried by the mandrel is seated, means for retarding rotation of the lower mandrel relative to the housing, and means connecting the mandrels operative in response to the rotation of the upper mandrel relative to the lower mandrel for drawing the lower mandrel upward to close the lateral ports therein and unseat the valve carried thereby to expose the pressure-responsive valve of the receptacle to the well fluid in said housing for entrapment of a sample.

6. A formation tester, comprising an upper mandrel formed at its upper end for securement to the lower end of a tester string, a tester housing open at its lower end rotatably suspended from the mandrel and into which the mandrel extends, a packer mounted on the lower end portion of the housing adapted to be seated in a well bore, a lower tubular sub interposed in said housing and having a through central bore, by-pass passages formed in the walls of said sub providing communication between the interior of the upper and lower portions of said housing, a sample receptacle detachably secured to the sub and closing the lower end of the central bore thereof and having a pressure-responsive valve exposed to the interior of the central bore, an upper tubular sub interposed in said housing, a lower tubular mandrel slidably received by the upper tubular sub and carrying a valve closing the upper end of the central bore of the lower sub to sealingly enclose the pressure-responsive valve, said lower tubular mandrel having lateral ports formed therein disposed below the upper tubular sub when the valve carried by the mandrel is seated, means for retarding rotation of the lower mandrel relative to the housing, means connecting the mandrels operative in response to the rotation of the upper mandrel relative to the lower mandrel for drawing the lower mandrel upward to close the lateral ports therein and unseat the valve carried thereby to expose the pressure-responsive valve of the receptacle to the well fluid in said housing for entrapment of a sample, and a valve closing the tubular housing at a point below the receptacle, said last-mentioned valve being connected to the tester string and operative in response to longitudinal movement of the tester string to be opened to permit fluid to flow into the housing.

7. A formation tester, comprising an upper mandrel formed at its upper end for securement to the lower end of a tester string, a tester housing open at its lower end rotatably suspended from the mandrel and into which the mandrel extends, a packer mounted on the lower end portion of the housing adapted to be seated in a well bore, a lower tubular sub interposed in said housing and having a through central bore, by-pass passageways formed in the walls of said sub providing communication between the interior of the upper and lower portions of said housing, a sample receptacle detachably secured to the sub and closing the lower end of the central bore thereof and having a pressure-responsive valve exposed to the interior of the central bore, an upper tubular sub interposed in said housing, a lower tubular mandrel slidably received by the upper tubular sub and carrying a slide valve slidably extending into the upper end of the central bore of the lower sub to close the same and thereby enclose the pressure-responsive valve, said lower tubular mandrel having lateral ports formed therein disposed below the upper tubular sub when the valve carried by the mandrel is seated, means for retarding rotary movement of the lower mandrel relative to the housing, means connecting the mandrels operative in response to rotation of the upper mandrel relative to the lower mandrel for drawing the lower mandrel upwardly to close the lateral ports therein and unseat the valve carried thereby to expose the pressure-responsive valve of the receptacle to the well fluid in said housing for the entrapment of a sample, the amount of upward movement necessary to close said lateral ports being less than the amount necessary to open the slide valve whereby the lateral ports are closed prior to the opening of said slide valve.

8. A formation tester, comprising an upper mandrel formed at its upper end for securement to the lower end of a tester string, a tester housing open at its lower end rotatably suspended from the mandrel and into which the mandrel extends, a packer mounted on the lower end portion of the housing adapted to be seated in a well bore, a lower tubular sub interposed in said housing and having a through central bore, by-pass passageways formed in the walls of said sub providing communication between the interior of the upper and lower portions of said housing, a sample receptacle detachably secured to the sub and closing the lower end of the central bore thereof and having a pressure-responsive valve exposed to the interior of the central bore, an upper tubular sub interposed in said housing, a lower tubular mandrel slidably received by the upper tubular sub and carrying a slide valve slidably extending into the upper end of the central bore of the lower sub to close the same and thereby enclose the pressure-responsive valve, said lower tubular mandrel having lateral ports formed therein disposed below the upper tubular sub when the valve carried by the mandrel is seated, means for retarding rotary movement of the lower mandrel relative to the housing, means connecting the mandrels operative in response to rotation of the upper mandrel relative to the lower mandrel for drawing the lower mandrel upwardly to close the lateral ports therein and unseat the valve carried thereby to expose the pressure-responsive valve of the receptacle to the well fluid in said housing for the entrapment of a sample, the distance of said lateral ports below the upper tubular sub when the mandrel is in its lower position being less than the distance between the lower end of the slide valve and the upper end of the bore in the lower sub whereby the lateral ports are first closed and then the slide valve is unseated when the mandrel is moved upwardly, and a valve closing the tubular housing at a point below the receptacle, said last-mentioned valve being connected to the tester string and operative in response to longitudinal movement of the tester string to be opened to permit fluid flow into the housing.

9. A formation tester, comprising an upper mandrel formed at its upper end for securement to the lower end of a tester string, a tester housing open at its lower end rotatably suspended from the mandrel and into which the mandrel extends, a packer mounted on the lower end portion of the housing adapted to be seated in a well bore, said tubular housing having spaced upper and lower smaller bores formed therein separated by a larger bore by-pass passageways providing communication between said larger bore and the interior of said housing below the lower smaller bore, a sample receptacle detachably secured to and within the housing and closing the lower end of the lower smaller bore, a lower tubular mandrel slidably received within and projecting downwardly from the upper smaller bore and carrying a valve closing the upper end of the lower smaller bore to sealingly enclose the pressure-responsive valve, said lower mandrel having lateral ports formed therein disposed below the walls of the upper smaller bore when the valve carried by the lower mandrel is fully seated, means for retarding rotary movement of the lower mandrel relative to the housing, and means connecting the mandrels operative in response to rotation of the upper mandrel relative to the lower mandrel for drawing the lower mandrel upwardly to close the lateral ports therein and unseat the valve carried thereby to expose the pressure-responsive valve of the receptacle to the well fluid in said larger bore for the entrapment of a sample.

10. A formation tester, comprising an upper mandrel formed at its upper end for securement to the lower end of a tester string, a tester housing open at its lower end rotatably suspended from the mandrel and into which the mandrel extends, a packer mounted on the lower end portion of the housing adapted to be seated in a well bore, said tubular housing having spaced upper and lower smaller bores formed therein separated by a larger bore, by-pass passageways providing communication between said larger bore and the interior of said housing below the lower smaller bore, a sample receptacle detachably secured to and within and projecting downwardly from the lower end of the lower smaller bore and having a pressure responsive valve exposed to the interior of said lower smaller bore, a lower tubular mandrel slidably received in and projecting downwardly from the upper smaller bore and carrying a valve closing the upper end of the lower smaller bore to sealingly enclose the pressure-responsive valve, said lower mandrel having lateral ports formed therein disposed below the walls of the upper smaller bore when the valve carried by the lower mandrel is fully seated, means for retarding rotary movement of the lower mandrel relative to the housing, means connecting the mandrels operative in response to rotation of the upper mandrel relative to the lower mandrel for drawing the lower mandrel upwardly to close the lateral ports therein and unseat the valve carried thereby to expose the pressure-responsive valve of the receptacle to the well fluid in said larger bore for the entrapment of a sample, and a valve closing the tubular housing at a point below the receptacle, said last-mentioned valve being connected to the tester string and operative in response to longitudinal movement of the tester string to be opened to permit fluid flow into the housing.

11. A formation tester, comprising an upper mandrel formed at its upper end for securement to the lower end of a tester string, a tester housing open at its lower end rotatably suspended from the mandrel and into which the mandrel extends, a packer mounted on the lower end portion of the housing adapted to be seated in a well bore, said housing having spaced upper and lower smaller bores formed therein separated by a larger bore, by-pass passageways providing communication between said larger bore and the interior of said housing below said lower smaller bore, a sample receptacle detachably secured to and within the housing and closing the lower end of the lower smaller bore, a lower tubular mandrel slidably received within and projecting downwardly from the upper smaller bore and carrying a slide valve slidably extending into the upper end of the lower smaller bore to close the same to thereby sealingly enclose the pressure-responsive valve of the receptacle, said lower mandrel having lateral ports formed therein disposed below the walls of the upper smaller bore when the valve carried by the lower mandrel is fully seated, means for retarding rotary movement of the lower mandrel relative to the housing, and means connecting the mandrels operative in response to rotation of the upper mandrel relative to the lower mandrel for drawing the lower mandrel upwardly to close the lateral ports therein and unseat the slide valve to expose the pressure-responsive valve of the receptacle to the well fluid in said larger bore for entrapment of a sample, the distance of the said lateral ports below the upper smaller bore when the mandrel is in its lower position being less than the distance between the lower end of the slide valve and the upper end of the lower smaller bore whereby the lateral ports are first closed and then the slide valve is unseated.

12. A formation tester, comprising an upper mandrel formed at its upper end for securement to the lower end of a tester string, a tester housing open at its lower end rotatably suspended from the mandrel and into which the mandrel extends, a packer mounted on the lower end portion of the housing adapted to be seated in a well bore, said housing having spaced upper and lower smaller bores formed therein separated by a larger bore, by-pass passageways providing communication between said larger bore and the interior of said housing below said lower smaller bore, a sample receptacle detachably secured to and within the housing and closing the lower end of the lower smaller bore, a lower tubular mandrel slidably received within and projecting downwardly from the upper smaller bore and carrying a slide valve slidably extending into the upper end of the lower smaller bore to close the same to thereby sealingly enclose the pressure-responsive valve of the receptacle, said lower mandrel having lateral ports formed therein disposed below the walls of the upper smaller bore when the valve carried by the lower mandrel is fully seated, means for retarding rotary movement of the lower mandrel relative to the housing, means connecting the mandrels operative in response to rotation of the upper mandrel relative to the lower mandrel for drawing the lower mandrel upwardly to close the lateral ports therein and unseat the slide valve to expose the pressure-responsive valve of the receptacle to the well fluid in said larger bore for entrapment of a sample, the distance of the said lateral ports below the upper smaller bore being less than the distance between the lower end of the slide valve and the upper end of the lower smaller bore whereby the lateral ports are first closed and then the slide valve is unseated, and a valve closing the tubular housing at a point below the receptacle, said last-mentioned valve being connected to the tester string and operative in response to longitudinal movement of the tester string to be opened to permit fluid flow into the housing.

References Cited in the file of this patent

UNITED STATES PATENTS

| | | |
|---|---|---|
| 2,073,107 | Johnston | Mar. 9, 1937 |
| 2,214,551 | Edwards | Sept. 10, 1940 |
| 2,316,216 | Bandy | Apr. 13, 1943 |
| 2,364,464 | Moore | Dec. 5, 1944 |
| 2,404,825 | Brown et al. | July 30, 1946 |